(12) United States Patent
Le Sauze et al.

(10) Patent No.: US 7,010,226 B2
(45) Date of Patent: Mar. 7, 2006

(54) PACKET ROUTER FOR USE IN OPTICAL TRANSMISSION NETWORKS

(75) Inventors: Nicolas Le Sauze, Bures-sur-Yvette (FR); Dominique Chiaroni, Antony (FR); Amaury Jourdan, Sevres (FR); Thierry Zami, Massy (FR)

(73) Assignee: Alcatel, Paris (FR)

( * ) Notice: Subject to any disclaimer, the term of this patent is extended or adjusted under 35 U.S.C. 154(b) by 740 days.

(21) Appl. No.: 09/986,020

(22) Filed: Nov. 7, 2001

(65) Prior Publication Data

US 2002/0071157 A1 Jun. 13, 2002

(30) Foreign Application Priority Data

Dec. 7, 2000 (FR) .................................. 00 15889

(51) Int. Cl.
*H04J 14/00* (2006.01)
(52) U.S. Cl. .............................. 398/49; 398/45; 398/50; 398/51; 398/53; 398/54; 398/57
(58) Field of Classification Search .................. 398/48, 398/49, 50, 51, 52, 53, 54, 45, 57
See application file for complete search history.

(56) References Cited

U.S. PATENT DOCUMENTS 5,365,358 A * 11/1994 Stein ........................... 398/55

FOREIGN PATENT DOCUMENTS

EP 0 852 437 A2 7/1998

OTHER PUBLICATIONS

Maeno Y et al: "A 2.56-TB/S Multiwavelength and Scalable Switch-Fabric for Fast Packet-Switching Networks" IEEE Photonics Technology Letters, IEEE Inc. New York, US, vol. 10, No. 8, Aug. 1, 1998, pp. 1180-1182.
Danielsen S L et al: "Wavelength Conversion in Optical Packet Switching" Journal of Lightwave Technology, IEEE. New York, US, vol. 16, No. 12, Dec. 1998, pp. 2095-2108.
Ishida O et al: "Parallel-Optical-Interconnecting Multiwavelength Star Network (POIMS NET) For High-Capacity Switching" Electronics Letters, IEE Stevenage, GB, vol. 32, No. 19, Sep. 12, 1996, pp. 1804-1806.

* cited by examiner

*Primary Examiner*—Leslie Pascal
*Assistant Examiner*—Quan-Zhen Wang
(74) *Attorney, Agent, or Firm*—Sughrue Mion, PLLC

(57) ABSTRACT

Packets conveying data are received by a router via input ports which impose on them optical carrier waves whose wavelengths correspond to the ports. Respective time-delays are applied to the packets and they are broadcast to spatial selectors that transmit them to spectral selectors. Amplifiers are distributed over the paths of the packets and the paths are organized in such a manner as to limit the number of semiconductor optical switches in the selectors and to minimize noise and optical crosstalk affecting the packets.

14 Claims, 4 Drawing Sheets

PACKET ROUTER FOR USE IN OPTICAL TRANSMISSION NETWORKS

CROSS-REFERENCE TO RELATED APPLICATIONS

This application is based on French Patent Application No. 00 15 889 filed Dec. 7, 2000, the disclosure of which is hereby incorporated by reference thereto in its entirety, and the priority of which is hereby claimed under 35 U.S.C. §119.

BACKGROUND OF THE INVENTION

1. Field of the Invention

The present invention relates in particular to data transmission networks using optical fibers.

2. Description of the Prior Art

Each node of a network of the above kind using optical fibers receives signals that come in particular from other nodes on the same network. The signals are optical signals, i.e. they are conveyed by optical waves, and are referred hereinafter as "input" signals. Likewise, the node sends, in particular to other nodes, other signals of the above kind that are referred to hereinafter as "output" signals. The output signals are equivalent to respective input signals in the sense that they convey the same data, but they may be in a different order and their carrier wavelengths may be different. Correspondences must be established between, on one hand, the sources from which the input signals come and, on the other hand, the destinations to which the equivalent output signals must be sent.

In networks that use asynchronous transmission, for example those which use prior art protocols such as the Asynchronous Transfer Mode (ATM) and the Internet Protocol (IP), the signals to be transmitted take the form of packets. Said correspondences to be established are then made by a management unit or controller included in the node for this purpose, and in this case the node is referred to as a router. The data that it is necessary for the router to have in order to fulfill its function is supplied to it in particular by labels that are specific to the respective packets and which can be included in packet headers, for example, or conveyed by waves allocated to that function.

The above kind of router has, on the-one hand, input ports via which it receives packets and, on the other hand, output ports via which it transmits packets equivalent to the input packets. The number of output ports is typically the same as the number of input ports. A "capacity" of the router is defined. It consists of the product of the number of input ports by the data bit rate that can be transmitted by the router via each of those ports. To convey the packets between its input ports and its output ports the router uses carrier waves whose wavelengths constitute operating wavelengths of the router. To select a path, and possibly a path duration, for each packet between an input port and an output port, it includes switches that usually consist of semiconductor optical amplifiers.

When implementing a transmission network using the above kind of router, it is desirable fir the number of users that can use the network to be as large as possible, and the same applies to the data bit rate that can be transmitted between the users. To this end it is desirable for the capacity of the routers included in the network to be increased. However, increasing the capacity of the above type of prior art router necessitates an equivalent increase in the number of operating wavelengths of the router and therefore in the number of carrier wavelengths received by each of its optical switches. In the above kind of switch, increasing the latter number can lead to four-wave mixing, causing optical crosstalk. The number of the above kind of switches is also necessarily increased. The increase in the capacity of the router is then limited both by the risk of optical crosstalk and by the cost of implementing the router and in particular the cost of implementing the optical switches necessary in this implementation.

A first router of the above kind is disclosed in the paper "A 2.56-Tb/s Multiwavelength and Scalable Switch-Fabric for Fast Packet-Switching Networks", Yoshiharu Maeno et al., IEEE Photonics Technology Letters, Vol. 10, No 8, August 1998. It has in particular the disadvantage that a path duration cannot be selected for each packet.

A second router of the above kind is disclosed in the paper "A 160 Gbit/s throughput photonic switch for fast packet switching systems", D. Chiaroni, D. de Bouard, C. Chauzat, J. C. Jacquinot, D. Bayart, P. Bousselet, M. Bachman and M. Sotom, Photonics In Switching, 1977, Technical Digest Series, Vol. 10, p 37–40. It has in particular the disadvantage that the number of optical switches necessary to implement it increases strongly as its capacity increases.

Each of the above two prior art routers also has the disadvantage of not limiting as much as would be beneficial noise and optical crosstalk that affect the packets at the output of the router.

One particular object of the present invention is to increase the capacity of the above kind of router and/or to limit its implementation cost whilst also limiting noise and the risk of optical crosstalk.

SUMMARY OF THE INVENTION

The invention provides a packet router for optical transmission networks, the router including input ports for receiving packets and for transmitting them in optical form with carrier wavelengths in corresponding relationship to the input ports, the router further including an input system for applying time-delays to the packets and broadcasting them to spatial selector systems for receiving the packets and transmitting them to spectral selector systems, all the systems making selections from the packets on command, the spectral selector systems making the selections in according with predetermined spectral assemblies, each of the assemblies having at least one wavelength and including the packets having a carrier wavelength equal to a wavelength of the assembly, each of the packets being included in one of the assemblies, and the router transmitting at its output packets obtained from the selections, in which router the input system includes a single time-delay system and the input system cooperates with the input ports to divide the packets into a plurality of groups each consisting of some of the packets, the number of the packet optical carrier wavelengths of each of the groups being a fraction of the number of the input ports and constituting a number of wavelengths of the group, the cooperation being such that the number of the spectral assemblies in accordance with which the spectral selector systems make the selections is equal to the greatest of the numbers of wavelengths of the groups.

How the invention can be put into practice is explained hereinafter by means of examples and with reference to the accompanying diagrammatic drawings. If the same component or a component providing the same functions is represented in more than one figure, it is designated therein by the same reference letters and/or numbers.

DETAILED DESCRIPTION OF THE PREFERRED EMBODIMENTS

With the aim of facilitating an understanding of the drawings, the routers shown are simplified routers that each have the same number of input ports and the same number of output ports, that number being equal to 6, and apply to the packets that they process the same number of time-delays, which number is equal to 2. However, the invention can be applied with advantage for higher values of these numbers.

With the same aim of facilitating an understanding of the drawings, some optical amplifiers are not shown. However, such amplifiers are in fact necessary to compensate the optical power losses suffered by the packets, in particular in each of the broadcasters included in the routers.

Features of some packet routers are described first. They are common to the second prior art router and both routers according to the invention.

In respect of these common features, the above kind of router can be included in a data transmission network routing signals constituting packets. Each packet carries data to be transmitted and has a routing label. When it is stated hereinafter that a packet has a carrier wavelength, that indicates that the packet is conveyed within the router by an optical wave having that wavelength.

The transmission network including the router is typically an optical fiber network organized in accordance with an asynchronous transfer mode. In an asynchronous transfer mode the packets appear in succession at various points of the network with time intervals that depend on the traffic of the network and which are therefore not necessarily uniform.

The router is an optical router in the sense that the packets remain in optical form within it and are output in optical form from it, i.e. each packet passing through the router is at all times conveyed therein by an optical carrier wave. The packets are typically also received in optical form. However, a packet could be received in a different form, for example in an electrical form.

Figure 1:
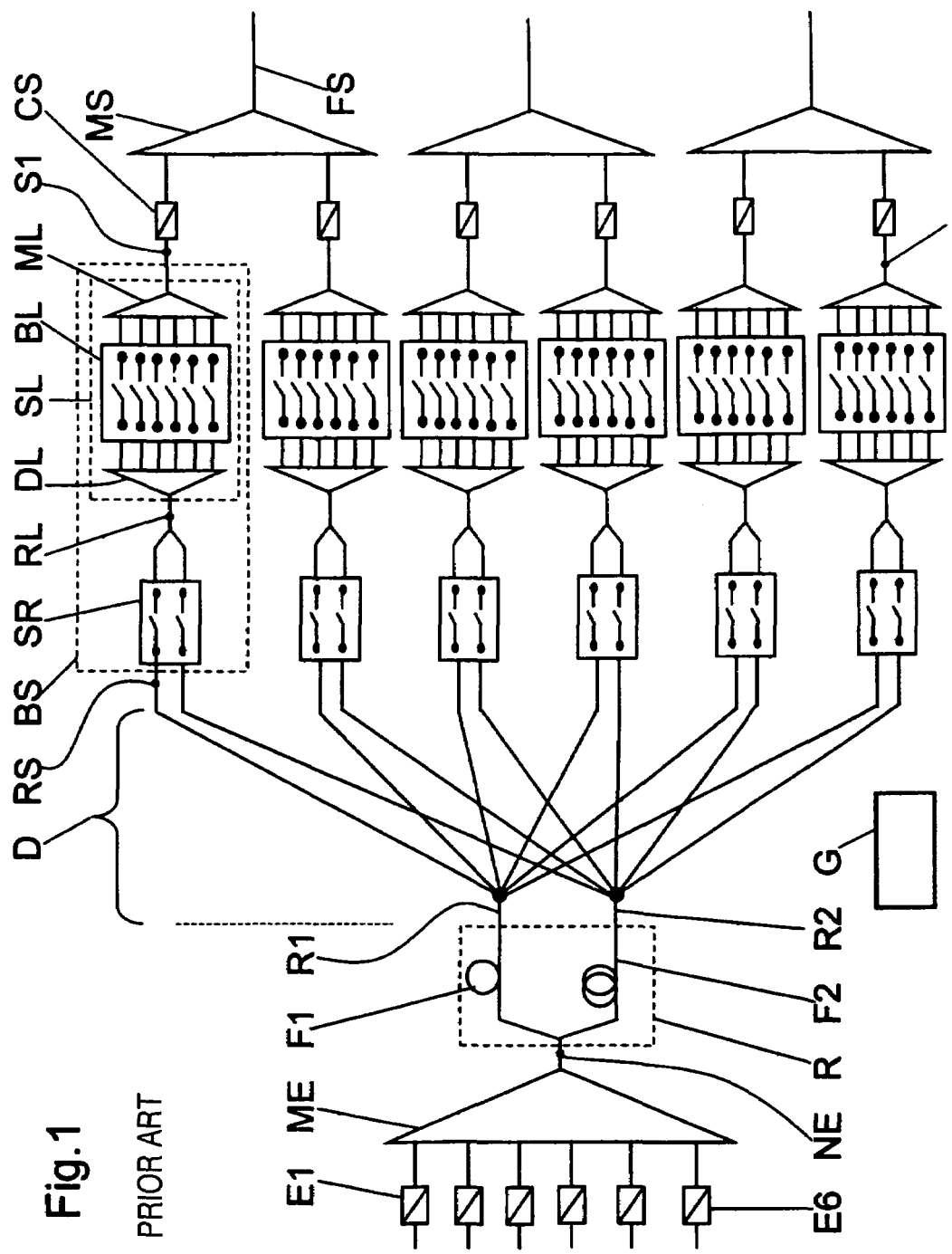
FIG. 1 shows the second prior art router previously mentioned.
Figure 2:
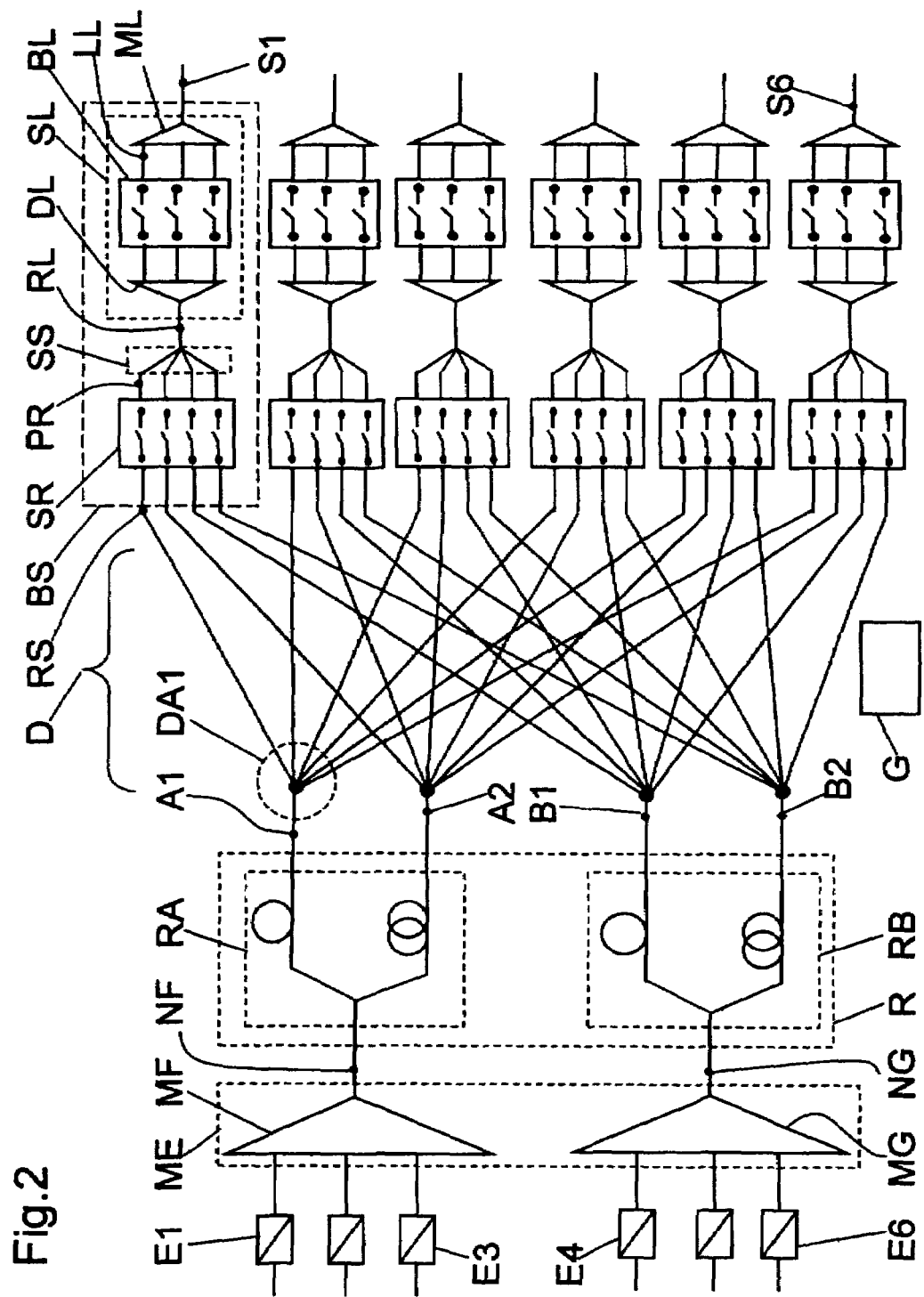
FIG. 2 shows a first router according to the invention.
Figure 3:
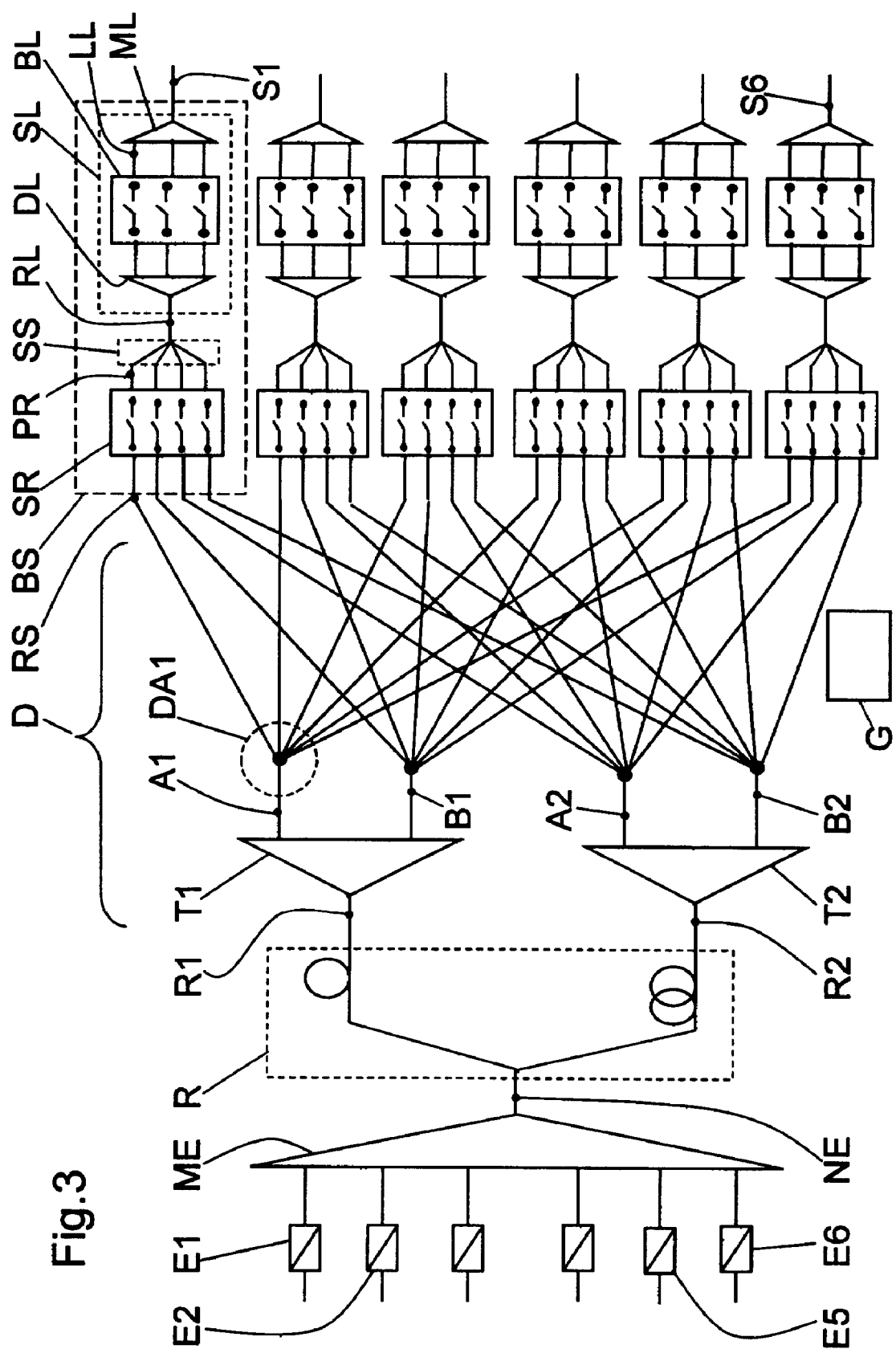
FIG. 3 shows a second router according to the invention.

As shown in FIGS. 1 to 3, the router includes a plurality of input ports E1 . . . E6. Each input port is assigned one of the operating wavelengths of the router and is disposed i:o receive said time succession of packets.

In the case of a network using multiplexes, for example spectral multiplexes, a plurality of input ports can be fed by the same optical fiber guiding the above kind of multiplex, i.e. each of these ports can receive the above kind of packets from that fiber. On a receive side of those ports, the ports fed by the above kind of fiber are then, for example, associated with respective multiplex wavelengths so that each receives the packets in the above kind of multiplex having the carrier wavelength with which that port is associated on the receive side.

Each of the input ports receiving a packet is adapted to transmit and to impose the condition that its carrier wavelength at the output of that port must be equal to the wavelength of that port.

For each packet of the above kind to have such a wavelength at the output from the above kind of port if it was in optical form at the input of that port, its carrier wavelength would usually be different from the wavelength of that port, and moreover, for it to be returned to an appropriate signal quality after degradations suffered in line, the input ports typically consist of prior art regenerators also effecting a wavelength conversion.

This router then includes an input multiplexer system and a time-delay system. The input multiplexer system ME is disposed to receive the packets at the output of the input ports. It has at least one output, such as the output NE in FIGS. 1 and 3 or the outputs NF and NG in FIG. 2. It is adapted to transmit to each output of the above kind packets that have been received by that system and have respective different carrier wavelengths.

The time-delay system R is disposed to receive the packets at the output of the input multiplexer system. It transmits those packets via a plurality of time-delay units having respective time-delays to a corresponding plurality of outputs, such as the outputs R1 and R2 in FIGS. 1 and 3 and the outputs A1 and A2 or B1 or B2 in FIG. 2, which follow on from those units and which constitute respective primary internal terminals. Each of these packets is transmitted to each of these terminals with the time-delay of the time-delay unit that precedes that terminal, this time-delay constituting a time-delay of that terminal. In said simplified routers a first time-delay of the above kind is that of the terminals R1, A1 and B1 and a second time-delay of the above kind is that of the terminals R2, A2 and B2.

The number k of different time-delays applied by the time-delay system is chosen as a function of the characteristics of the traffic of the network including the router. In real routers it is typically close to 16 and generally less than 32. These time-delays form a succession in which they have respective ranks, that succession beginning with a first time-delay. The succession is typically regular, i.e., except for the first time-delay, each of these time-delays is equal to a preceding time-delay increased by a predetermined time-delay increment independent of the rank of this preceding time-delay. The first time-delay is preferably substantially zero so that each time-delay is equal to said time-delay increment multiplied by a number that is one less than the rank of that time-delay. This time-delay increment is chosen as a function of the format of the packets and the characteristics of the intended traffic for the router.

The above kind of succession of time-delays is easily achieved with the aid of a time-delay unit, such as the unit R in FIGS. 1 and 3 or such as the unit RA or RB in FIG. 2. The above kind of unit includes a succession of delay lines that consist of optical fibers with staggered lengths, such as the fibers F1 and F2 in FIG. 1, and which constitute said time-delay units. Each of these fibers then connect the output of the input multiplexer system to one of the primary internal terminals. The above kind of unit has sometimes been referred to as "optical buffer memory".

This router then includes a broadcaster system and a plurality of selector units.

The broadcaster system D connects each of the primary internal terminals to a plurality of distribution terminals such as the terminal RS. Hereinafter each of these distribution terminals is considered to have a time-delay consisting of the time-delay of that primary internal terminal, it being understood that no supplementary time-delay is applied to the packets by this system or these distribution terminals.

The input multiplexer system, the time-delay system and the broadcaster system constitute an input system that cooperates with the input ports E1 ... E6 to form connections connecting those ports to those distribution terminals.

Each of the selector units, such as the unit BS, has, for each of said time-delays, an input consisting of a distribution terminal, such as the terminal RS, having that time-delay. Hereinafter that input is considered also to have that time-delay. Said connections are such that, for each of these units, each of the packets received via one of these ports is transmitted via one of these connections to one of the inputs of this unit. This unit receives selection instructions designating this block, each of these instructions further designating one of said input ports and one of its inputs of this block. It responds to each of these instructions by selecting one of the packets received at this input. The carrier wavelength of this selected packet is the wavelength of the port designated by this instruction. This unit has an output and is adapted to transmit the selected packet to that output. To this end it includes a distribution terminal selector SR and a wavelength selector SL.

Figure 4:
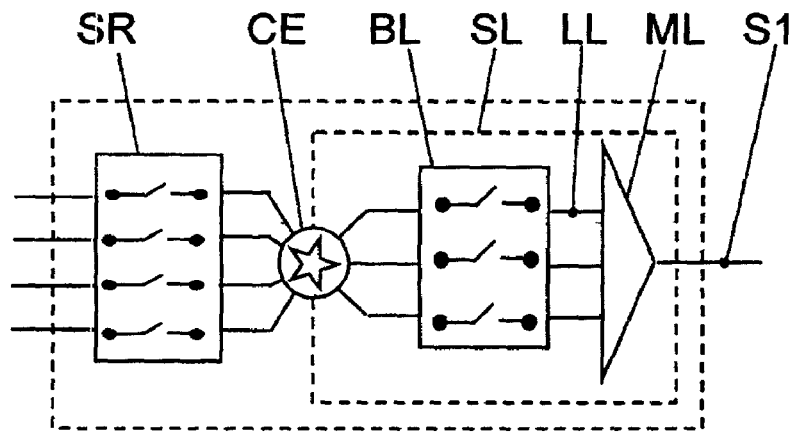
FIG. 4 shows an alternative embodiment of a selector unit of the first or second router according to the invention.

The distribution terminal selector SR has, on the one hand, a plurality of inputs consisting of the respective inputs, such as the input RS, of this unit and, on the other hand, an output RL. In the figures, that output is represented in the form of a common terminal of a (k.b):1 combiner SS placed at the output of the selector SR. The number b is defined hereinafter. It has the value 1 in the case of FIG. 1. It has the value 2 in the case of FIGS. 2 and 3, in which this combiner is designated by the reference letters SS. However, in accordance with an alternative, and sometimes advantageous, disposition shown in FIG. 4, the output RL can consist of the at least virtual common terminal of a star coupler such as a (k.b):(n/b) coupler. If this selection unit receives a selection instruction designating this unit and one of these inputs, that selector responds to that instruction by connecting its output RL to that input, such as the input RS. The time-delay applied to the packet that is then transmitted to that output by the system R is therefore that of that input. Each selection instruction therefore selects one of the time delays of the system R.

The wavelength selector SL has an input consisting of the output RL of the distribution terminal selector and an output S1 constituting said output of the selector unit. If the selector unit BS receives a selection instruction designating this unit, that selector responds to that instruction by selectively transmitting from its input to its output the packet whose carrier wavelength is the wavelength of the input port designated by that instruction.

Figure 5:
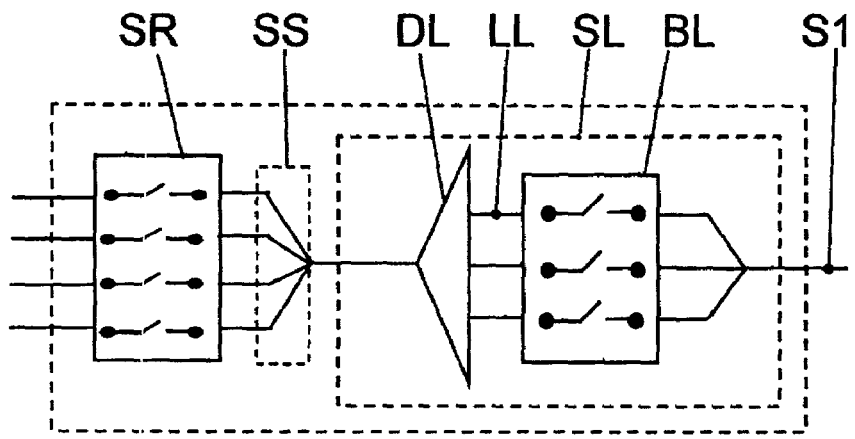
FIG. 5 shows another, alternative embodiment of the selector unit.

This wavelength selector typically includes wavelength splitters and a wavelength terminal selector BL. In a first case, shown in FIG. 4, the splitters consist of a spectral splitter ML connected to the output of this selector. In a second case, shown in FIG. 5, they consist of a splitter DL of this kind connected to the input of this selector. In a third case, shown in FIGS. 1 to 3, and preferred for facilitating a distribution of the optical amplifiers, the same splitters consist of two such splitters, one DL connected to the input and the other ML connected to the output of this selector.

Each spectral splitter has, on the one hand, a common terminal, such as the terminal RL or S1, and, on the other hand, a plurality of terminals constituting wavelength terminals respectively associated with at least some of the operating wavelengths of the router. It transmits selectively between this common terminal and each of these wavelength terminals the packets whose carrier wavelength is associated with that terminal. A splitter of this kind preferably consists of a prior art multiplexer or a demultiplexer.

In said first and second cases, the wavelength terminal selector BL has, on the one hand, a common terminal and, on the other hand, a plurality of wavelength terminals which are then those of the single spectral splitter. In the first case, in which this single splitter is connected at the output of this selector, the latter is connected to the distribution terminal selector SR via the star coupler of the alternative disposition shown in FIG. 4. The output of the wavelength selector SL is then the common terminal of the single spectral splitter ML. In the second case, in which the single splitter DL is connected to the input of this terminal selector BL, the common terminal RL of this splitter constitutes both the output of the distribution terminal selector SR and the input of the wavelength selector SL. The output of the wavelength selector SL is then the common terminal of the wavelength terminal selector BL. In said third case, the wavelength terminal selector BL has, on the one hand, a plurality of input terminals respectively consisting of the wavelength terminals of the spectral splitter connected to its input, and, on the other hand, a plurality of output terminals respectively consisting of the wavelength terminals of the spectral splitter connected to its output. If this selector units receives a selection instruction designating this unit and an input port, that selector responds to that instruction by ;electively connecting, either, in said first and second cases, its (possibly virtual) common terminal to that of the wavelength terminal that is associated with the wavelength of that port, or, in the third case, one of its input terminals to one of its output terminals, these terminals being those that are associated with the wavelength of that port.

In all three cases, the input and the output of the wavelength selector respectively consist of two of said common terminals of the wavelength terminal selector and/or a spectral splitter.

Each of said two terminal selectors preferably consists of a succession of optical switches and each of these switches takes the form of a semiconductor optical amplifier. The selection instructions then control the electrical power supply currents of these amplifiers. All the switches of the same terminal selector are typically integrated on the same semiconductor strip.

Output ports of the router consist of the respective outputs S1 ... S6 of the selector units.

To form the selection instructions, the router finally includes a management unit G responsive both to the routing labels of the packets received by the router and to traffic data additionally received from the transmission network. This unit responds to the routing label of each of the packets received by each of these input ports by sending a selection instruction concerning that packet. That instruction designates that port and at least one of the selection units and further selects one of the time-delays, depending on the traffic data. This unit typically consists of an electronic data processor. It receives the data from the routing labels via optical couplers and opto-electronic transducers, not shown. These couplers are placed on the upstream side of the input multiplexer system and possibly on the upstream side of the input ports.

In each of the two routers in accordance with this invention, erbium-doped fiber amplifiers (EDFA) are typically connected in series to the output of each input multiplexer, such as the multiplexer ME, or to each output of a time-delay unit, such as the unit R. Amplifiers can also be connected in series to the output terminal of each distribution terminal selector, such as the terminal SR, if that terminal is individualized, such as the terminal RL, or alternatively to the output of each selector unit, such as the unit BS.

Output converters, such as the converters CS in FIG. 1, are typically connected to respective output ports, such as the ports S1, to receive the packets selected by the selector units, such as the units BS. Like the converters of the input ports, these output converters have respective wavelengths that they impose on the packets that they transmit as carrier wavelengths. These wavelengths are typically predetermined and, in the wavelength division multiplex context, they are chosen to enable further routing of these packets in the network. Each such multiplex is formed of an output multiplexer such as the multiplexer MS. That multiplexer receives the pickets from a plurality of selector units via a plurality of wavelength converters, such as converters CS, whose output wavelengths are staggered, the combination of these blocks and converters constituting a selector module associated with this multiplexer. The multiplex formed is then guided by an output optical fiber, such as the fiber FS. The above kinds of converters, multiplexers and output fibers are likewise connected to the output of the routers from FIGS. 2 and 3, but are not shown.

All the selector modules can include the same number d of selector units. Each output fiber then guides a multiplex consisting of packets having the same number of respective carrier wavelengths. If the number of such modules is c, the product c×d is typically equal to the number n of input ports.

As shown in FIG. 1, said second prior art router has the common features described above and further has the following more particular features:

The number of operating wavelengths is equal to the number n of input ports, those ports having respective operating wavelengths.

The input multiplexer system consists of a prior art multiplexer constituting an input multiplexer.

The number of inputs of each of the selector units is the number k of time-delays of the time-delay system.

The number of carrier wavelengths of packets transmitted by each of these terminals is the number n of input ports.

It follows from the above particular features that, in each selector unit, the number of switches of the distribution terminal selector is the number k of time-delays of the time-delay system and that the number of switches of the wavelength terminal selector is the number n of operating wavelengths.

It has n the past been required for the number n of input ports of this kind of router to be as large as possible. However, it has appeared difficult, in economic terms, to give to this number the increased values, such as 32 or 64, unless the number k has a value such as 16 or 32, the product k×n having to remain less than 1024. This difficulty results from the fact that a significant fraction of the cost of the router would then be related to the number k+n of switches that must be included in the terminal selectors of each selector unit and that must be controlled individually by the management unit. Moreover, the number of wavelengths seen by some of the optical switches of the router would then be excessive, for example equal to 32, which would cause the unwanted phenomenon of four-wave mixing within these switches and would therefore lead to optical crosstalk.

In accordance with the present invention the connections formed by the input system in cooperation with the input ports, on one hand, divide all of these input ports between a plurality of input groups each consisting of a plurality of these ports and, on the other hand, divide all of the distribution terminals into a plurality of internal groups respectively associated with these input groups and each including at least one such terminal. The wavelengths of the ports of each of these input groups form a succession of different wavelengths specific to a respective succession of these ports. Each distribution terminal of each of these internal groups constitutes a terminal of this group and this group includes a plurality of such terminals, the respective time-delays of these terminals forming a succession of different time-delays. Said division is obtained by virtue of the fact that these connections connect the ports of one input group only to the terminals of the internal group associated with that input group and connect those terminals only to those ports.

Each of the groups of packets previously mentioned consists of the packets that are received by one of the input groups and which therefore transit in the router via the internal group associated with that input group. It is then associated with that input group and with that internal group, and when used hereinafter the word "group" may apply equally well to this kind of group of packets and to the input group or the internal group associated with that group of packets.

The respective number of ports in the various input groups are preferably similar. More specifically, the difference between each of these numbers of ports and the absolute value of the ratio n/b of the total number n of input ports to the number b of these groups preferably remains less than this number of groups, in accordance with the condition:

$$n/b-b<g<n/b+b$$

in which g designates the number of ports included in any of the input groups. In the typical case where n can be divided by b, all the input groups preferably have the same number n/b of input ports, and this is the situation that is considered hereinafter.

The succession of time-delays is preferably a regular succession as described above and the number k of time-delays of that succession is chosen as previously indicated. Each distribution selector then has, for each of the b groups, a number k of inputs respectively connected to the same number of distribution terminals of that group. Thus the number of its inputs and therefore the number of its optical switches is the product k×b. Also, the number of carrier wavelengths in each group is equal to the number of input ports of the group, i.e. is equal to the quotient n/b. The number of optical switches of each wavelength terminal selector is equal to the number of wavelengths, i.e. it is equal to this quotient. The total number of optical switches in each of the n selector units is therefore given by the expression:

$$k.b+n/b$$

If the number b is varied, this expression has a minimum value for:

$$b^2=n/k$$

This is why, with the aim of limiting the number of optical switches in each selector unit, and therefore the total number of the switches in the router, the number b of input groups is preferably from 25% to 400%, and even more preferably around 100%, of the square root $\sqrt{n/k}$ of the ratio of the number n of input ports to the number k of time-delays of said succession of said time-delays, only if the resulting ratio n/b does not exceed 16. In all cases, with the aim of avoiding the phenomenon of four-wave mixing, the number b is chosen so that this ratio n/b does not significantly exceed 16 and so that the same applies for each of the numbers g of ports respectively included in the input groups.

In the context of what is technically feasible at present, the number b of input groups is typically at least equal to 2 and at most equal to 64. For example b=2 if n=32 and k=8 and the number of optical switches in each of the n=32 selector units is then:

$$8 \times 2 + 32/2 = 32$$

whereas, for the same values of n and of k, the number of these switches in each such block of the second prior art router is:

$$8 + 32 = 40.$$

Likewise b=4 if n=64 and k=6 and the corresponding number of switches is:

$$6 \times 4 + 64/4 = 40$$

whereas in the same prior art router it is:

$$6 + 64 = 70.$$

In the first router according to this invention, the groups are spatially separated on the upstream side of the input multiplexer system ME.

This first router has the following specific features, which can be seen in FIG. 2:

The wavelengths of the input ports form a spectral succession $\lambda 1 \ldots \lambda p$ consisting of different wavelengths in each of the input groups and at least a majority of the wavelengths in that succession are included in the corresponding spectral succession of each of the other input groups.

If, for example, and as shown, b=2 and the number n is even, the two input groups E1 . . . E3 and E4 . . . E6 have the same spectral succession $\lambda 1 \ldots \lambda p$ and the number p of wavelengths in that succession is p=n/2.

The input multiplexer system ME includes an input multiplexer for each of the input groups, i.e. two input multiplexers MF and MG, for example. These multiplexers constitute respective multiplexers of the groups. Each of them is disposed to receive and wavelength division multiplex the packets transmitted via the ports of its group. It has an output for transmitting the multiplexed packets.

The time-delay system R includes, for each of these input groups, a time-delay unit, such as the two units RA and RB, to receive these multiplexed packets. For each of said time-delays this unit has a primary internal terminal having that time-delay.

The broadcaster system D includes, not only for each of the time-delays, but also for each of the time-delay units, a broadcaster, such as the broadcaster DA1, connecting the primary internal terminal, such as the terminal A1, having that time-delay to a plurality of distribution terminals connected to that primary internal terminal. That broadcaster constitutes a broadcaster of that primary internal terminal. It connects that primary internal terminal to n distribution terminals, such as the terminals RS. A prior art "broadcast coupler" or "splitter" is one example of a broadcaster of this kind Finally, the inputs of each of the selector units include a group of these unit inputs for each of the input groups and each of these unit input groups includes one of these inputs for each of the primary internal terminals. That input consists of one of the distribution terminals and it is connected to that primary internal terminal via the broadcaster of the latter.

In this first router according to this invention, the spectral assemblies each have a single Wavelength. This router has the advantage of a limited number of spectral assemblies in accordance with which the spectral selector means, such as the selector SL, must make selections, and consequently the number of optical switches that must be included in each such selector to make those selections. Thanks to the above features, each of these numbers can be limited to the ratio n/b.

In the second router according to this invention, the groups are spatially separated in the broadcast system, which has the advantageous of simplifying the time-delay system.

The second router has the following particular features, which can be seen in FIG. 3:

The wavelengths of the input ports E1 . . . E6 form a single spectral succession $\lambda 1 \ldots \lambda n$ consisting of different wavelengths.

The input multiplexer system includes a single multiplexer ME disposed to receive and wavelength division multiplex the packets transmitted via the input ports, and this system has a single output for transmitting these multiplexed packets.

The time-delay system includes a single time-delay unit R disposed to receive these multiplexed packets and this unit has, for each of said time-delays, a primary internal terminal, such as the terminal R1 or R2, having that time-delay.

The broadcast system D includes:

a plurality of broadcasters, such as the broadcasters DA1, each having an input, such as the input A1, and a plurality of outputs, such as the outputs RS, and each connecting that input to each of these outputs, and a plurality of spectral splitters, such as the splitters T1 and T2.

Each of these splitters, such as the splitter T1, has an input, such as the input R1, and a plurality of outputs, such as the outputs A1 and B1, and receives said multiplexed packets on that input. Those outputs are respectively associated with groups of wavelengths consisting of respective fractions of said plurality of operating wavelengths, these respective fractions being the same for all these splitters. Each of these splitters transmits, to each of its outputs, only one group of the packets that it receives, that group consisting of the packets having a carrier wavelength included in the group of wavelengths associated with an output.

Each or the distribution terminals, such as the terminal RS, is connected to a primary internal terminal, such as the terminal R1, by the broadcast system D via a spectral splitter, such as the splitter T1, and at least one broadcaster, such as the broadcaster DA1.

The inputs of each of the selector units, such as the units BS, include a group of these inputs for each of the groups of wavelengths and each of those groups of inputs includes one of those inputs for each of the primary internal terminals, that input being connected to that primary internal terminal via the broadcaster system and one of the distribution terminals.

In this second router according to the invention, as a result of the above particular features, for each group of wavelengths, an input group consists of all the input ports having a wavelength included in this group of wavelengths and one of said internal groups consists of all the distribution terminals connected to primary internal terminals via those of the outputs of the spectral splitters that are associated with that group of wavelengths.

Also, in this second router, the spectral assemblies each have the number b of wavelengths and the number of these assemblies is equal to the number of ports included in an input group, i.e. that number can be limited to the ratio n/b, as in the first router according to this invention.

Preferably, and as shown, but not necessarily, the input of each of the spectral splitters, such as the splitters T1, consists of a primary internal terminal, such as the terminal R1. Each broadcaster, such as the broadcaster DA1, is then disposed between a splitter of the above kind and the distribution terminal connected to that primary internal terminal, which limits the number of such splitters, that number then being equal to the number k of time-delays. An EDFA can be placed either between each output, such as the output A1 or B1, and the broadcaster, such as the broadcaster DA1, connected to that output, or at each primary terminal, such as the terminal R1.

The operating wavelengths typically form a substantially regular succession, each of these wavelengths having a rank in that succession, and the groups of wavelengths typically form a succession including a number b of these groups, each of these groups having a rank in that succession. It is then preferable if each of these groups of wavelengths selectively includes the operating wavelengths such that the rank r of that group and the rank q of each of those wavelengths satisfy the condition:

$r = q$ modulo $b$.

The spectral splitters T1 and T2 are then periodic splitters, and to be more specific periodic: demultiplexers or filters with period b. A splitter of this kind has, on the one hand, at the input or at the output, a common terminal and, on the other hand, at the output or the input, respectively, a number b of particular terminals, each of the latter allowing to pass a fraction of the n operating wavelengths. A particular terminal of rank i typically allows to pass through the splitter n/b operating wavelengths that are non-consecutive and have the ranks i, i+b, i+2b, etc. For example, in the typical case shown, in which n is even and b=2, a first group of wavelengths consists of the wavelengths of odd rank $\lambda 1$, $\lambda 3 \ldots \lambda n-1$, and a second group of wavelengths consists of the wavelengths of even rank $\lambda 2, \ldots \lambda n$.

A disposition of this kind can facilitate the implementation of the spectral splitters included in the wavelength selectors, i.e. the demultiplexers DL and the multiplexers ML in the form of prior art demultiplexers or multiplexers known as "band" demultiplexers or multiplexers and referred to hereinafter as "band splitters". A splitter of this kind has, on the one hand, at the input or at the output, a common terminal and, on the other hand, at the output or at the input, respectively, a number n/b of particular terminals, each of the latter allowing to pass a fraction of the n operating wavelengths. A particular terminal of rank i typically allows to pass through the splitter b consecutive operating wavelengths having ranks in the range from rank b (i−1)+1 to rank b (i−1)+b, inclusive. The particular terminal of rank 1 selects the wavelengths $\lambda 1$ and $\lambda 2$, that of rank 2 selects the wavelengths $\lambda 3$ and $\lambda 4$, and so on.

Instead of this, the spectral splitters, such as the splitters T1 and T2, could consist of band splitters while the splitters, such as the splitters DL and ML, would be periodic splitters. The rank q of an operating wavelength and the rank r of the group including that wavelength would then typically satisfy the condition:

$r = 1 +$ integer part of $[(q-1)/(n/b)]$.

It is required for the optical packet routers to achieve high capacities even if the bit rate of data per port is set. The number of their input or output ports can then become large, typically greater than 256. It is also desirable for these routers to achieve logic performance comparable with that of electronic packet routers. This is why the optical combiners, such as the combiners SS, included in the selector units can be large, typically greater than 16 to 1. This implies high optical losses and consequently too low a signal/noise ratio at the output of the wavelength selectors, such as the selectors SL. Moreover, recombining a large number of optical paths within a combiner of this kind can lead to excessively high levels of optical crosstalk.

Figure 6:
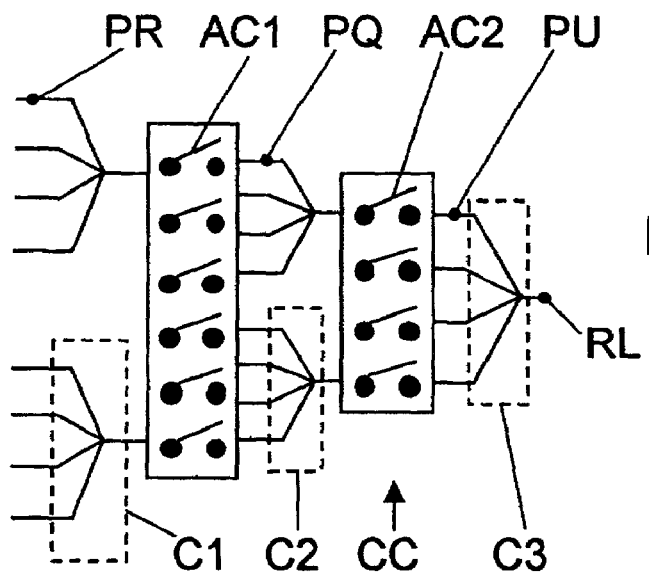
FIG. 6 shows a switched optical amplification system that can be included in the first or second router according to the invention.

This is why, in accordance with the present invention, and as shown in FIGS. 2, 3 and 6, the distribution terminal selector, such as the selector SR, of each selection unit, such as the unit BS, is preferably of the following kind:

As in the prior art, it includes a succession of optical switches having respective inputs constituting respective inputs of this selection unit, such as the input RS. These switches also have respective outputs constituting respective orientation outputs, such as the output PR, these inputs being respectively associated with these outputs. As in the prior art, it also includes combination systems forming connections respectively connecting these orientation outputs to the output of this selector, such as the output RL. In the context of this invention these connections include switched amplifiers, such as the amplifiers AC1 and AC2. Each of these switched amplifiers is connected at the input at least indirectly to some of the orientation outputs, those outputs and the inputs associated with those outputs constituting an upstream group of this amplifier. This group includes a plurality of these outputs and excludes several others of them. These switched amplifiers are controlled in accordance with the selection instructions so that the gain of each of these amplifiers is temporarily increased if one of the inputs of the upstream group of that amplifier is designated by one of those instructions.

All or some of the connections formed by the combiners can each include a series succession of a plurality of switched amplifiers each having a plurality of inputs and only one output, these inputs respectively belonging to a plurality of these connections. At least two of these amplifiers are consecutive in a succession of the above kind. They then respectively constitute a preceding amplifier, such as the amplifier AC1, and a subsequent amplifier, such as the amplifier AC2, the output of this preceding amplifier, such as the output PQ, constituting one of the inputs of this subsequent amplifier.

FIG. 6 shows by way of example a switched amplifier system CC adapted to replace a combiner, such as the combiner SS. This system is made up of three stages of J to 1 combiners, such as the combiners C1, C2 and C3, respectively, connected by two sets of switched amplifiers respectively including the amplifiers AC1 and AC2. The number J has the value 4 in the figure and can typically have the value 4 or 8. The amplifiers, such as the amplifiers AC1 and AC2, are semiconductor optical amplifiers whose gains can be greatly modified at a speed compatible with the time interval separating two packets. If a packet is transmitted to the single output RL, only the amplifiers transmitting that packet receive a power supply current conferring on them a high gain. All the other amplifiers are then highly absorbent, which avoids transmission and recombination of amplified spontaneous emission in the upstream amplifiers. The result of this is a strong increase in the ratio of the power of the signal to the power of the optical crosstalk.

This invention can be implemented in modes other than those described above. In particular, if the number b of groups is a relatively large number, such as 4 or 6, the spatial splitting of the groups can be mixed, i.e. a first such splitting can be made into a number z of groups in accordance with the first of these two modes and a second such splitting into a number h of groups in accordance with the second of these modes, the number of groups then being b=z×h. Also, the indications given as to the types of spectral splitters and to the compositions of the groups of wavelengths have been given for simple cases, and the implementation of a router can, f(or reasons of availability of components and/or numbers of ports imposed by a network structure, depart somewhat from these indications, whilst benefiting therefrom, as to these types and/or these compositions. Finally, a third router according to this invention would differ from the second one in that it would not include any time-delay system, its broadcaster system D including a single spectral splitter, such as the splitter Ti, connected at the output of the multiplexer ME. It would include a single primary internal terminal, the time-delay of which would be nil.

What is claimed:

1. A packet router for optical transmission networks, said router including input ports for receiving packets and for transmitting them in optical form with carrier wavelengths in corresponding relationship to said input ports, said carrier wavelengths defining a plurality of operating wavelengths, said router further including an input system for applying time-delays to said packets and broadcasting them to spatial selector systems for receiving said packets and transmitting them to spectral selector systems, in which router said input system includes:

a multiplexer disposed to receive and wavelength division multiplex said packets transmitted by said input ports, time-delay system including a single time-delay unit disposed to receive said multiplexed packets, said unit having for each of said time-delays one primary internal terminal having said time-delay, a broadcaster system including a plurality of spectral splitters, each of said splitters having an input connected to an associated primary internal terminal, and a plurality of outputs, each of said outputs being connected to a plurality of distribution terminals, said outputs being respectively associated with groups of wavelengths comprising respective fractions of said plurality of operating wavelengths, said respective fractions being the same for all said splitters.

2. The packet router claimed in claim 1, adapted to be included in a data transmission network for routing respective signals constituting said packets, each of said packets conveying information to be transmitted and being provided with a routing label, said packet being adapted to be conveyed by optical waves having respective wavelengths, said wavelength of an optical wave conveying said packet constituting said carrier wavelength of said packet, and said router having a plurality of operating wavelengths and including:

a plurality of said input ports, each of said input ports being assigned one of said operating wavelengths and being disposed to receive said packets in succession in time, an input multiplexer system disposed to receive said packets at outputs of said input ports, said system having at least one output and being adapted to transmit to each output of said system said packets having respective different carrier wavelengths received by said system, a time-delay system disposed to receive said packets at the output of said input multiplexer system, said time-delay system having an assembly of outputs respectively constituting primary internal terminals, said terminals having respective time-delays, and said time-delay system being adapted to transmit each of said packets to each of said terminals with a time-delay equal to said time-delay of said terminal, a broadcaster system for connecting each of said primary internal terminals to a plurality of distribution terminals each having a time-delay consisting of said time-delay of said primary internal terminal, said input multiplexer system, said time-delay system and said broadcaster system constituting said input system, and said input system cooperating with said input ports to form connections for connecting said ports to said distribution terminals, a plurality of selector units, each of said units having a plurality of inputs, said inputs consisting of a plurality of said distribution terminals and being assigned said time-delays of respective terminals, said connections being such that, for each of said units, each of said packets received by one of said ports is transmitted by one of said links of said port to one of said inputs of said unit, said unit being adapted to receive selection instructions designating it, each of said instructions further designating one of said input ports and one of said inputs of said block, said block being adapted to respond to each of said instructions by selecting one of said packets received at one of its inputs, said carrier wavelength of said selected packet being said wavelength of the input port designated by said instruction and said input being said input of said block designated by said instruction, said unit having an output constituting an output port of said router, and said unit being adapted to transmit said selected packet to said output and to this end including:

a distribution terminal selector having, on the one hand, a plurality of inputs respectively consisting of said inputs of said block and, on the other hand, an output, and said selector constituting one of said space selector systems and being adapted to receive those of said selection instructions that designate said selector units and to respond to each such instruction by connecting said output to that of said inputs that is designated by that instruction, and a wavelength selector having an input consisting of said output of said distribution terminal selector, said wavelength selector having an output constituting said output of said selector unit and said selector constituting one of said spectral selection systems and being adapted to receive those of said selection instructions that designate said selector units and to respond to each such instruction by selectively transmitting from its input to its output that of said packets whose carrier wavelength is the wavelength of the input port designated by said instruction, said router further including a management unit sensitive to said routing labels and to traffic data received from said transmission network, said unit being adapted to respond to said routing label of each of said packets received by said router by sending a selection instruction concerning said packet and said instruction designating that of said input ports which received said packet and further designating in accordance with said traffic data at least one of said selector units and one of said inputs of said unit, in which router said connections formed by said input system in cooperation with said input ports, on the one hand, divide all of said input ports into a plurality of input groups each consisting of a plurality of said ports and, on the other hand, divide all of said distribution terminals into a plurality of internal groups respectively associated with said input groups and each including at least one such terminal, said wavelengths of the ports of each of said input groups forming a succession of different wavelengths respectively specific to a succession of said ports, said distribution terminals of each of said internal groups constituting terminals of said group, the respective time-delays of said terminals being different and forming a succession of time-delays of said internal group, and said divisions being effected by virtue of the fact that said connections connect the ports of one of said input groups only to the terminals of said internal group associated with said input group and connecting said terminals only to said ports.

3. The packet router claimed in claim 2, wherein the absolute value of the difference between each of the respective numbers of ports included in said input groups and the ratio of the terminal number of input ports to the number of said groups is less than said number of groups.

4. The packet router claimed in claim 3, wherein number b of said input groups is at least equal to 2 and at most equal to 64.

5. The packet router claimed in claim 4, wherein said number b of said input groups is the greater of two numbers, a first of said two numbers being from 25% to 400% of the square root of the ratio of said number n of said input ports to a number k of time-delays of said succession of time-delays, a second of said two numbers being equal to said number n divided by 16.

6. The packet router claimed in claim 2 wherein all said internal groups have the same succession of time-delays.

7. The packet router claimed in claim 2 wherein said wavelengths of said input ports form a spectral succession consisting of different wavelengths, said input multiplexer system including a multiplexer disposed to receive and wavelength division multiplex said packets transmitted by said input ports and said system having an output for transmitting said multiplexed packets, said time-delay system including a single time-delay unit disposed to receive said multiplexed packets, said unit having for each of said time-delays one of said primary internal terminals having said time-delay, said broadcaster system including:

a plurality of broadcasters each having one input and a plurality of outputs and each connecting said input to each of said outputs, and a plurality of spectral splitters, each of said splitters having an input and a plurality of outputs and being disposed to receive on said inputs said multiplexed packets, said outputs being respectively associated with groups of wavelengths consisting of respective fractions of said plurality of operating wavelengths, said successive fractions being the same for all said splitters, each of said splitters being adapted to transmit to each of said outputs only one group of said packets, and said group consisting of said packets having one of said carrier wavelengths included in said group of wavelengths associated with said output, each of said distribution terminals being connected to one of said primary internal terminals by said broadcaster system via one of said spectral splitters and at least one of said broadcasters, and said inputs of each of said selector units including a group of said inputs of each of said groups of wavelengths, each of said groups of inputs of said block including one of said inputs for each of said primary internal terminals, said input consisting of one of said distribution terminals and being connected to said primary internal terminal via said broadcaster system, whereby, for each of said groups of wavelengths, one of said input groups consists of all of said input ports assigned a wavelength included in said group of wavelengths and one of said internal groups consists of all of said distribution terminals connected to said primary internal terminals via those of said outputs of said spectral splitters that are associated with said group of wavelengths.

8. The packet router claimed in claim 7 wherein said input of each of said spectral splitters consists of a primary internal terminal.

9. The packet router claimed in claim 7 wherein said operating wavelengths form a substantially regular succession, each of said wavelengths having a rank in said succession, said groups of wavelengths forming a succession including a number b of said groups, and each of said groups having a rank in said succession, and wherein at least some of said groups of wavelengths each include a plurality of said operating wavelengths such that the rank r of said group and the rank q of each of said wavelengths satisfy the following condition: r=q modulo b.

10. The packet router claimed in claim 7 wherein said wavelength selector of each of said selector units includes:

at least one spectral splitter having, on the one hand, a common terminal and, on the other hand, a plurality of particular terminals constituting wavelength terminals respectively associated with at least some of said operating wavelengths, said splitter being adapted to transmit selectively between said common terminal and each of said wavelength terminals those of said packets whose carrier wavelength is associated with said terminal, and a wavelength terminal selector having at least one plurality of terminals respectively consisting of said wavelength terminals of a spectral splitter and said selector being adapted to receive one of said selection instructions designating said selector unit and one of said input ports and to respond to said instruction by enabling the selective transmission of said packets via at least one of said terminals of said selector associated with said wavelength of said port, and wherein each of said spectral splitters of said wavelength selector is a band splitter, said spectral splitters of said broadcaster system being periodic splitters.

11. The packet router claimed in claim 7 wherein said operating wavelengths form a substantially regular succession, each of said wavelengths having a rank in said succession, said groups of wavelengths forming a succession including a number b of said groups, and each of said groups having a rank in said succession, and wherein at least some of said groups of wavelengths each include a plurality of said operating wavelengths such that the rank r of said group and the rank q of each of said wavelengths satisfy the following condition:

$$r = 1 + \text{integer part of } [(q-1)/(n/b)].$$

12. The packet router claimed in claim 7 wherein said wavelength selector of each of said selector units includes:

at least one spectral splitter having, on the one hand, a common terminal and, on the other hand, a plurality of particular terminals constituting wavelength terminals respectively associated with at least some of said operating wavelengths, said splitter being adapted to transmit selectively between said common terminal and each of said wavelength terminals those of said packets whose carrier wavelength is associated with said terminal, and a wavelength terminal selector having at least one plurality of terminals respectively consisting of said wavelength terminals of a spectral splitter, said selector being adapted to receive one of said selection instructions designating said selector unit and one of said input ports and to respond to said instruction by enabling the selective transmission of said packets via at least one of said terminals of said selector associated with said wavelength of said port, and wherein each of said spectral splitters of said wavelength selector is a periodic splitter, said spectral splitters of said broadcaster system being band splitters.

13. The packet router claimed in claim 2 wherein said distribution terminal selector of each of said selector units includes:

a succession of optical switches having respective inputs respectively constituting said inputs of said selector unit, said switches having respective outputs respectively constituting orientation outputs, and said inputs being respectively associated with said outputs, and combiner systems forming connections for respectively connecting said orientation outputs to said output of said selector, and wherein said combiner systems include switched amplifiers, each of said switched amplifiers being connected at the input at least indirectly to some of said orientation outputs, said outputs and said inputs associated with said outputs constituting an upstream group of said amplifier, said group including a plurality of said outputs and excluding another plurality of said outputs, and said switched amplifiers being controlled by said selection instructions so that the gain of each of said amplifiers is temporarily increased if one of said inputs of said upstream group of said amplifier is designated by one of said instructions.

14. The packet router claimed in claim 13 wherein at least some of said connections formed by said combiner systems each include a serial succession of several of said switched amplifiers each having a plurality of inputs and a single output, said inputs respectively belonging to a plurality of said connections, at least two of said amplifiers being consecutive in said succession and respectively constituting a preceding amplifier and a following amplifier, and said output of said preceding amplifier constituting one of said inputs of said following amplifier.

* * * * *